J. F. BUDLONG.
Stitch-Ripper.

No. 208,459. Patented Oct. 1, 1878.

Witnesses.
Alba R. Abbott
Socrates Scholfield

Inventor
James F. Budlong.

UNITED STATES PATENT OFFICE.

JAMES F. BUDLONG, OF PROVIDENCE, RHODE ISLAND.

IMPROVEMENT IN STITCH-RIPPERS.

Specification forming part of Letters Patent No. 208,459, dated October 1, 1878; application filed January 14, 1878.

*To all whom it may concern:*

Be it known that I, JAMES F. BUDLONG, of Providence, in the State of Rhode Island, have invented an Improved Stitch-Ripping Device, of which the following is a specification:

The nature of my invention consists in an improved implement for ripping the stitches made by a sewing-machine, when from any cause it is desirable to disjoin the pieces of cloth.

Figure 1:
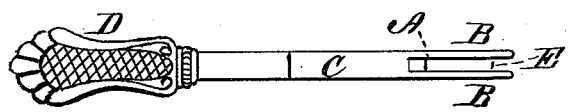
Figure 2:
Figure 3:
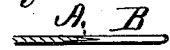

Figure 1 is a top view, and Fig. 2 a side view, of my invention. Fig. 3 is a partial longitudinal section.

A transverse straight knife, A, is formed between the two prongs B B, the shank C being bent upward and attached to a handle, D, as shown in Fig. 2, the upward bend of the shank C serving to keep the hand of the operator properly raised from the cloth when working with the instrument.

The space E between the prongs B B is made wide enough to allow the knife to be vibrated back and forth slightly, so as to surely cut the stitches.

In operating with this device the cloth is to be properly secured to some object by pinning or otherwise, and one of the prongs B inserted behind the row of stitches, so as to bring the row between the two prongs B B. Then by pushing the knife forward, and at the same time working it from side to side through its restricted limit, the stitches will be cut with certainty and ease, thus constituting a highly-desirable improvement.

I claim as my invention—

1. The combination of the prongs B B and the straight transverse knife A, whereby a sidewise vibratory motion may be imparted across the line of the stitches, substantially as described.

2. The combination of the prongs B B, knife A, and the upward-curved shank C, substantially as described.

3. The combination of the prongs B B, knife A, upward-curved shank C, and handle D, substantially as described.

JAMES F. BUDLONG.

Witnesses:
SOCRATES SCHOLFIELD,
ALBA R. ABBOTT.